United States Patent [19]

Zenker

[11] 4,282,762

[45] Aug. 11, 1981

[54] LOAD SENSING TRANSDUCER

[75] Inventor: Richard L. Zenker, Grosse Pointe Woods, Mich.

[73] Assignee: Kelsey-Hayes Company, Romulus, Mich.

[21] Appl. No.: 88,879

[22] Filed: Oct. 29, 1979

[51] Int. Cl.³ .............................................. G01L 1/22
[52] U.S. Cl. ............................... 73/862.52; 73/862.65
[58] Field of Search .................... 73/141 A, 832, 826, 73/763, 781

[56] References Cited

U.S. PATENT DOCUMENTS

| 2,582,886 | 1/1952 | Ruge ................................... 73/141 A |
| 2,775,887 | 1/1957 | Hines .................................. 73/141 A |
| 3,100,290 | 8/1963 | Propper ............................. 73/141 A |
| 3,240,065 | 3/1966 | Taber ............................. 73/141 A X |
| 3,295,086 | 12/1966 | Laimins et al. ..................... 73/141 A |
| 3,315,202 | 4/1967 | Johns et al. ................... 73/141 A X |
| 3,872,715 | 3/1975 | Pittaro ................................ 73/901 X |
| 3,885,427 | 5/1975 | Melcher et al. .................... 73/141 R |
| 3,911,738 | 10/1975 | Fischer .............................. 73/141 R |

FOREIGN PATENT DOCUMENTS 2556441 12/1975 Fed. Rep. of Germany ........ 73/862.62
1088345 10/1967 United Kingdom ................. 73/862.62

Primary Examiner—Daniel M. Yasich
Attorney, Agent, or Firm—Ralph J. Skinkiss; Oliver E. Todd, Jr.

[57] ABSTRACT

A dual range transducer is disclosed for accurately measuring loads in both low ranges and high ranges. The transducer includes an annular member having strain gauges mounted on side regions for measuring low loads applied between end regions of the annular member. When loads greater than the low ranges are applied to the end regions of the annular member, a gap closes and the loads are transferred through an anvil and a spindle which contains a second strain gauge for measuring the higher loads.

5 Claims, 6 Drawing Figures

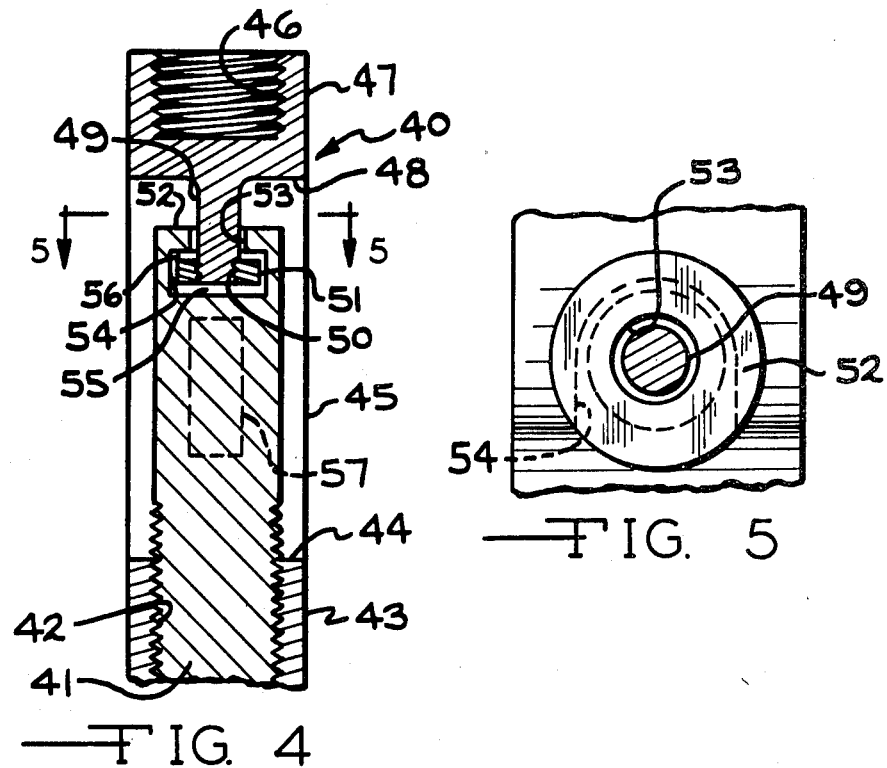
FIG. 4
FIG. 5
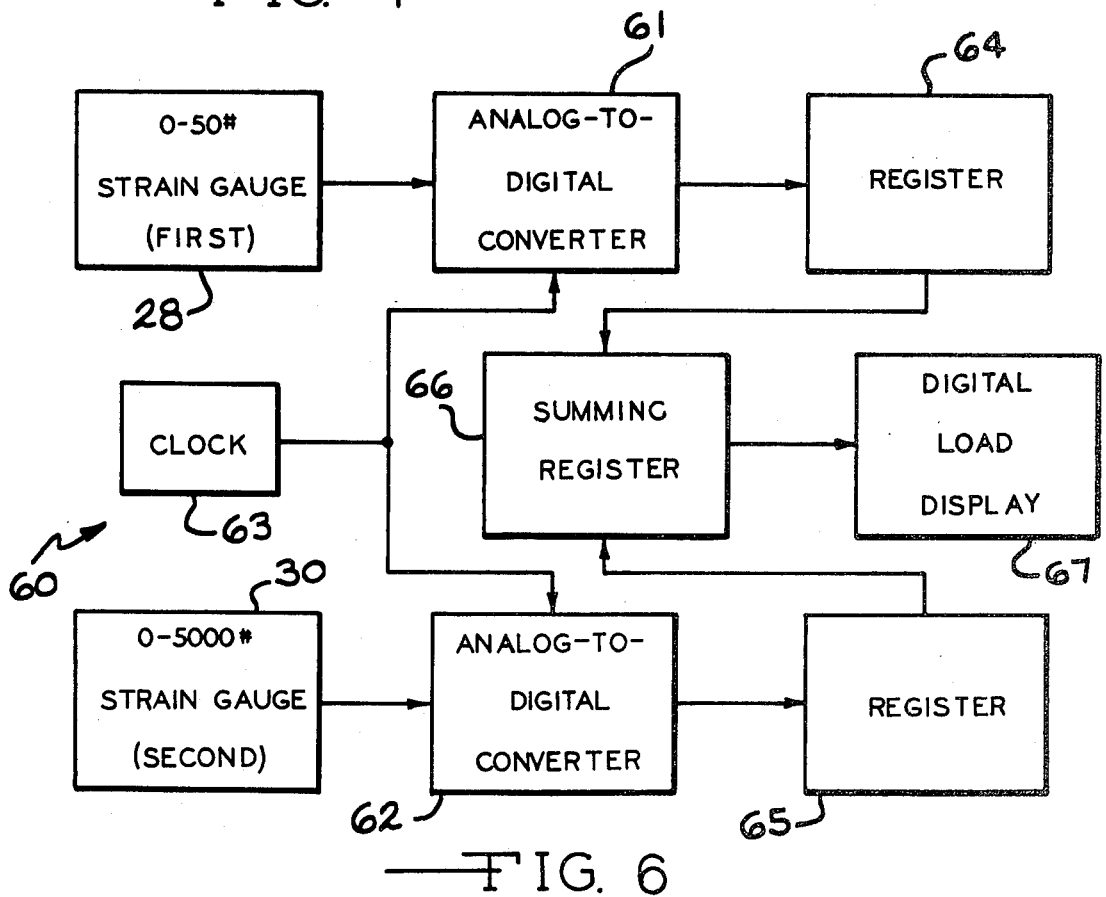
FIG. 6

LOAD SENSING TRANSDUCER

BACKGROUND OF THE INVENTION

This invention relates to load sensing apparatus and more particularly to a dual range force transducer for measuring compressive or tensile loads.

In many laboratory and commercial applications, it is desirable or necessary to measure either compressive or tensile forces. These forces may vary over a wide range and it may be necessary to have accurate measurements at both ends of the range. For example, it is desirable to know the magnitude of the brake drag for a dynamometer. Under heavy braking, loads as great as 3,000 pounds or more may be exerted by the brake. In order to measure these forces, a 5,000 pound strain gauge might be used. However, when the brakes are allowed to only drag, a force of perhaps only 20 pounds may be exerted. In order to measure this force using a 5,000 pound strain gauge transducer, the output of the transducer must be highly amplified. In view of the high amplification, the system is subject to error due to electrical noise both from the amplifier and from other nearby electrical equipment such as motors, relays, switches, brushes, etc. A low capacity transducer, such as a 50 pound strain gauge transducer for measuring a 20 pound load, is not susceptible to electrical noise of this type since its output need not be highly amplified. However, the large capacity transducer is required to measure the stopping torques present in the dynamometer.

SUMMARY OF THE INVENTION

According to the present invention, a dual range transducer is provided for measuring compressive loads and/or tensile loads. The transducer is provided with first strain gauges which measure loads, for example, on the order of from 0 to 50 pounds and a second strain gauges which measure loads on the order of, for example, 50 pounds to 5,000 pounds. The transducer includes an annular member having diametrically opposed end regions to which the load or force being measured is applied. The first strain gauges are attached to diametrically opposed sides of the annular member which are spaced between the end regions. As the load is applied to the opposed end regions, the side regions are subject to a elastic deformation. An increasing elastic deformation of the side regions as the load increases in turn causes an increasing output from the first strain gauges. This output is amplified and may be applied through an analog-to-digital converter to a digital load indicator; or from the amplifier directly to a recorder.

An anvil and a spindle are mounted within the annular member in alignment with the diametrically opposed end regions. A spacing is provided between the anvil and the spindle to define a gap which closes when a predetermined load is applied to the end regions. For example, if the first strain gauges are designed to measure from 0 to 50 pounds, then the gap is adjusted to close when a 50 pound load is applied to the end regions. As additional loading is applied to the end regions, this load is transmitted between the anvil and the spindle and no further elastic deformation takes place in the side regions of the annular member. The second strain gauge measures the load or force transmitted between the anvil and the spindle. The output of the second strain gauge also can be amplified and applied to a recorder or digitized and applied to a digital indicator, for example. However, the output of the second strain gauge will be offset from a true reading by the maximum output, e.g. 50 pounds, from the first strain gauges since the second strain gauge will not begin to indicate an output until the side regions of the annular member are deformed so that the anvil and spindle come into contact with one another. Through the use of the two strain gauges, highly accurate load indications may be obtained over two widely differing load ranges, such as over a range of 0 to 50 pounds and over a range of from 0 to 5,000 pounds. Since the output of the strain gauges measuring low load levels need not be highly amplified, the low load levels are accurately indicated and are not highly susceptible to error due to electrical noise.

Accordingly, it is an object of the invention to provide an improved transducer for measuring loads over two different load ranges.

Another object of the invention is to provide a load measuring transducer capable of accurately measuring low level loads and also capable of measuring high level loads.

Other objects and advantages of the invention will become apparent from the following detailed description, with reference being made to the accompanying drawings.

BRIEF DESCRIPTION OF THE DRAWINGS

FIG. 4 is a fragmentary cross sectional view, similar to FIG. 3, and showing a modified embodiment of the invention;

FIG. 5 is a cross sectional view taken along line 5—5 of FIG. 4; and

FIG. 6 is a schematic block circuit diagram showing exemplary apparatus for indicating the output from the strain gauges in the transducer of the present invention.

DETAILED DESCRIPTION OF THE INVENTION

Figure 1:
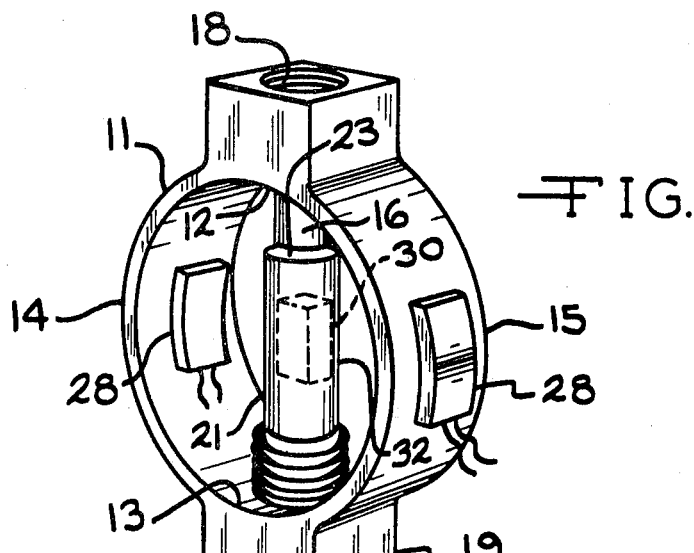
FIG. 1 is a perspective view of a load measuring transducer constructed in accordance with one embodiment of the invention.
Figure 2:
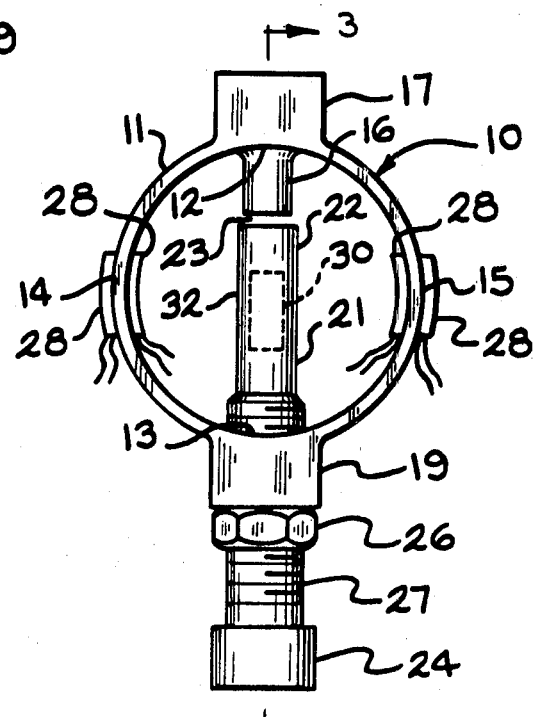
FIG. 2 is a side elevational view of the transducer of FIG. 1.
Figure 3:
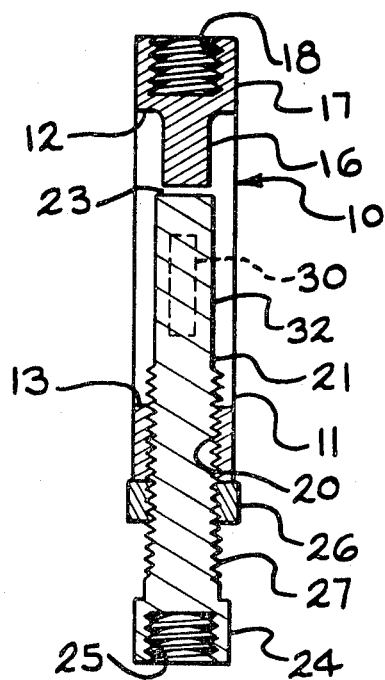
FIG. 3 is a cross sectional view taken along line 3—3 of FIG. 2.

Turning now to the drawings and particularly FIGS. 1–3, a two capacity transducer 10 is illustrated in accordance with one embodiment of the invention for measuring compressive loads or forces. For the following description, it will be assumed that the transducer 10 accurately measures loads or forces in a low range of from 0 to 50 pounds and also measures loads in a high range of from 0 to 5,000 pounds. However, the transducer 10 may be modified for measuring loads over any desired ranges, as will be readily apparent to those skilled in this art.

The transducer 10 includes an annular member 11 having two diametrically opposed end regions 12 and 13 and two diametrically opposed side regions 14 and 15 spaced between the end regions 12 and 13. At the end region 12, an anvil 16 projects radially inwardly into the annular member 11. The end region 12 also is provided with a shoulder 17 which defines an outwardly directed blind threaded opening 18. The end region 13 is provided with a shoulder 19. A threaded opening 20 extends through the shoulder 19 for receiving a corresponding threaded portion 27 of a spindle 21. The spindle 21 has an end 22 within the confines of the annular member 11 which defines a small gap 23 with respect to the anvil 16. The spindle 21 also has an end 24 located external to the annular member 11 and defining a blind threaded opening 25. A lock nut 26 is provided on the threaded portion 27 of the spindle 21 external to the annular member 11. The nut 26 is tightened against the shoulder 19 to lock the spindle 21 to the annular member 11.

A first set of strain gauges 28 are mounted on the side regions 14 and 15 of the annular member 11. The strain gauges 28 are selected to measure low level loads which elastically deform the side regions 14 and 15 of the annular member 11, such as loads less than 50 pounds. These loads are applied to the transducer 10 through apparatus (not shown) engaging the threaded opening 18 in the shoulder 17 and the threaded opening 25 in the end 25 of the spindle 21.

A second strain gauge 30 is mounted on or within the spindle 21 in a region 32 between the threaded portion 27 and the spindle end 22 or the strain gauge 30 may be mounted on or within the anvil 16 by techniques known in the art. The strain gauge 30 measures higher order compressive forces between the anvil 16 and the spindle 21 such as loads up to 5,000 pounds. However, the lower magnitude loads are not measured by the strain gauge 30 since the gap 23 between the spindle 21 and the anvil 16 will confine all lower level loads to the side regions 14 and 15 of the annular member 11. Conversely, all higher level loads are measured by the strain gauge 30 since closure of the gap 23 prevents further elastic deformation of the side regions 14 and 15 of the annular member 11. The gap 23 is adjusted by turning the spindle 21 in the threaded opening 20 in the annular member 11 so that the gap 23 just closes when the maximum load to be measured by the strain gauges 28 is reached. Once the gap 23 closes, no further deformation will take place in the side regions 14 and 15 of the annular member 11 and all additional forces above those required to close the gap 23 are transmitted between the anvil 16 and the spindle 21. As a consequence of the gap 23, the strain gauge 30 will have an output which is offset from a true load indication by the load or force required to close the gap 23, e.g., by 50 pounds. Therefore, the output of the strain gauges 28 must be summed with the output of the strain gauge 30 to obtain an accurate reading in the higher ranges.

Turning now to FIGS. 4 and 5, a fragmentary cross section illustrated of a modified embodiment of a dual capacity transducer 40. The transducer 40 is similar to the transducer 10, except that it is capable of measuring either compressive or tensile loads applied between a spindle 41 which engages a threaded opening 42 through a shoulder 43 at one end region 44 of an annular member 45 and a threaded opening 46 in a shoulder 47 at a diametrically opposed end region 48 of the annular member 45. The lower end of the spindle 41, which is not shown, may be identical to the lower end 24 of the spindle 21 shown in FIGS. 1–3. A shaft 49 projects radially inwardly from the end region 48 of the annular 45 and has threaded end 50. A disc 51 is threaded on to the shaft end 50. The shaft 49 and the disc 51 correspond to the anvil 16 in the previously described transducer 10. The spindle 41 is provided with an end 52 through which an opening 53 is bored to receive the shaft 49. A slot 54 is milled in the spindle 41 below the end 52. The slot 54 is formed to receive the disc 51 and also to allow threading the disc 51 on to the shaft end 50 when the transducer 40 is initially manufactured. A gap 55 is defined between the disc 51 and the spindle 41 in a direction towards the end region 44 of the annular member 45 and a gap 56 is defined between the disc 51 and the spindle 41 in the direction of the end region 48 of the annular member 45. An increasing compressive load on the annular 40 will eventually cause the gap 55 to close, applying a compressive load to the spindle 41 and an increasing tensile load on the transducer 40 will eventually cause the gap 56 to close, thereby applying a tensile load to the spindle 41. A second strain gauge 57 mounted within the spindle 41 will indicate either a compressive or a tensile load on the transducer 40, depending upon the nature of the applied load.

It should be noted that by turning the spindle 41 within the threaded opening 42, the gap 55 or the gap 56 may be adjusted so that either gap will close when a predetermined compressive or tensile load is applied to the transducer 40. It also should be noted that by providing gaps 55 and 56 on both sides of disc 51, the transducer 40 will be protected from damage should a high load be applied in both directions. In the transducer 10 illustrated in FIGS. 1–3, a high tensile may cause plastic deformation of the side regions 14 and 15 of the annular member 11. Since the gaps 55 and 56 restrict movement of the side regions of the annular member 45 of the transducer 40 shown in FIGS. 4 and 5, such side regions cannot be moved to a point of plastic deformation and, therefore, are protected from damage.

Turning now to FIG. 6, a schematic block diagram is illustrated of an exemplary circuit 60 for indicating a load measured by the dual range tranducer 10 illustrated in FIGS. 1–3. The first or low range strain gauge 28 for the transducer 10 has an output applied to an analog-to-digital converter 61 and the second or high range strain gauge 30 has an output applied to an analog-to-digital converter 62. A clock 63 is provided for periodically cycling both converters 61 and 62. The output of the converter 61 is stored in a register 64 and the output of the converter 62 is stored in a register 65. The contents of the two registers 64 and 65 are applied to a summing register 66 and the sum is applied to a conventional digital display 67 which indicates the total load measured by the transducer 10. If, for example, a load of 25 pounds is applied to the transducer 10, this load will be measured by the first strain gauges 28 and the converter 61 will store 25 pounds in the register 64. Since the strain gauge 30 will have no output, the register 65 will contain a 0. The contents of the registers 64 and 65 are applied to the summing register 66, which will store the 25 from the register 64, and this number is indicated on the display 67 as the total load. If a total load of 2,500 pounds is applied to the transducer 10, the first strain gauge 28 will have an output which will cause the converter 61 to store 50 pounds in the register 64. The strain gauge 30 will have an output at the same time which will cause the converter 62 to store 2,450 pounds in the register 65. The contents of the two registers 64 and 65 are added together and stored in the summing register 66 as 2,500 pounds and this load is indicated on the digital display 67.

Although the circuit 60 has been described in combination with the transducer 10 of FIGS. 1–3, it also will function with the transducer 40 of FIGS. 4 and 5. Of course, other types of analog or digital circuits may be used with the transducers 10 and 40. For example, the outputs of the strain gauges 28 and 30 for the transducer 10 may be separately amplified and applied to analog meters which cover the appropriate load ranges, e.g.

from 0 to 50 pounds for the gauge 28 and from 50 to 5,000 pounds for the gauge 30.

It will be appreciated that various changes and modifications may be made in the above-described embodiments of a dual range transducer. For example, only exemplary weight ranges were provided for the low range and the high range measured by the transducers 10 and 40. Furthermore, it will be appreciated that variations may be made in a manner in which the anvil formed by the shaft 49 and the disc 51 and the spindle 41 are interconnected to measure either tensile or compressive loads. Various other modifications and changes also may be made without departing from the spirit and the scope of the following claims.

I claim:

1. A dual range load measuring transducer comprising an annular member having two diametrically opposed end regions and two diametrically opposed side regions spaced between said end regions, means for applying a load between said end regions, such load elastically deforming said side regions, first strain gauge means for measuring any force between said end regions deforming said side regions, an anvil, an adjustable spindle, means mounting said anvil on said spindle within said annular member in alignment with said diametrically opposed end regions and spaced apart to define a gap, said gap having a preselected adjustable spacing which closes when an applied load between said end regions exceeds a predetermined load whereby such predetermined load is the maximum load deforming said regions and any additional load above such predetermined load is transmitted between said anvil and said spindle, and second strain gauge means located on one of said spindle and said anvil for measuring any load transmitted between said anvil and said spindle.

2. A dual range load measuring transducer, as set forth in claim 1, and further including means responsive to rotation of said adjustable spindle for changing the spacing of said gap whereby such predetermined load is changed.

3. A dual range load measuring transducer, as set forth in claim 2, wherein said gap changing means comprises thread means interconnecting said spindle and one of said end regions of said annular member.

4. A dual range load measuring transducer, as set forth in claim 2, wherein said means for applying a load applies a tensile load between said end regions.

5. A dual range load measuring transducer, as set forth in claim 1, wherein said first strain gauge means has a first output and said second strain gauge means has a second output, and further including converter means for digitizing said first and second outputs, means for summing such digitized first and second outputs, and digital indicator means for displaying such summed digitized outputs.

* * * * *